US012028485B2

(12) United States Patent
Skinner et al.

(10) Patent No.: US 12,028,485 B2
(45) Date of Patent: Jul. 2, 2024

(54) INTEGRATED REPRESENTATIVE PROFILE DATA IN CONTACT CENTER ENVIRONMENT

(71) Applicant: State Farm Mutual Automobile Insurance Company, Bloomington, IL (US)

(72) Inventors: Chad Skinner, Talladega, AL (US); Aaron Kammeyer, Clinton, IL (US); Amit Gupta, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 322 days.

(21) Appl. No.: 17/477,269

(22) Filed: Sep. 16, 2021

(65) Prior Publication Data

US 2022/0086279 A1 Mar. 17, 2022

Related U.S. Application Data

(60) Provisional application No. 63/079,051, filed on Sep. 16, 2020.

(51) Int. Cl.
*H04M 3/00* (2024.01)
*G06Q 10/0639* (2023.01)
(Continued)

(52) U.S. Cl.
CPC ...... *H04M 3/5175* (2013.01); *G06Q 10/0639* (2013.01); *H04M 3/5232* (2013.01); *H04M 2203/402* (2013.01); *H04M 2203/558* (2013.01)

(58) Field of Classification Search
CPC .............. H04M 3/5175; H04M 3/5232; G06Q 10/0639
See application file for complete search history.

(56) References Cited

U.S. PATENT DOCUMENTS 6,243,763 B1 6/2001 Brodsky et al.
6,263,066 B1 7/2001 Shtivelman et al.
(Continued)

FOREIGN PATENT DOCUMENTS

EP 1163564 12/2001

OTHER PUBLICATIONS

Bozdag, et al., "A Comparision of Push and Pull Techniques for AJAX", 2007 9th IEEE International Workshop on Web Site Evolution, doi: 10.1109/WSE.2007.438.0239, 2007, pp. 15-22.
(Continued)

*Primary Examiner* — Rasha S Al Aubaidi
(74) *Attorney, Agent, or Firm* — Lee & Hayes, P.C.

(57) ABSTRACT

Various techniques described herein relate to building and using representative data systems to store and manage representative profile data within contact centers. A representative data system integrates with external communication services and other internal/external systems to provide a uniform data store and interface to create and manage representative profiles. The representative data system retrieves and analyzes representative profile data during runtime contact center operations such as contact queuing, contact management, and/or workforce management. The representative data system may be implemented using relational or graph-based data structures to support advanced predictive modeling and impact analysis of scenarios such as service outages, dynamic workload shifting, infrastructure changes, and workforce changes.

20 Claims, 7 Drawing Sheets

(51) Int. Cl.
*H04M 3/51* (2006.01)
*H04M 3/523* (2006.01)

(56) References Cited

U.S. PATENT DOCUMENTS

| | | |
|---|---|---|
| 6,301,246 B1 | 10/2001 | Shaffer |
| 6,324,580 B1 | 11/2001 | Jindal |
| 6,621,895 B1 | 9/2003 | Giese |
| 6,771,766 B1 | 8/2004 | Shafiee et al. |
| 6,775,377 B2 | 8/2004 | McIllwaine et al. |
| 6,904,143 B1 | 6/2005 | Peterson et al. |
| 7,072,966 B1 | 7/2006 | Benjamin et al. |
| 7,092,509 B1 | 8/2006 | Mears et al. |
| 7,233,980 B1 | 6/2007 | Holden et al. |
| 7,315,616 B2 | 1/2008 | Annadata et al. |
| 7,353,253 B1 | 4/2008 | Zhao |
| 7,505,577 B2 | 3/2009 | Annadata et al. |
| 7,685,037 B2 | 3/2010 | Reiners |
| 7,730,204 B2 | 6/2010 | Pak |
| 7,788,679 B2 | 8/2010 | Chen et al. |
| 7,805,487 B1 | 9/2010 | Isaacs et al. |
| 7,922,493 B1 | 4/2011 | Gennaro et al. |
| 7,965,995 B2 | 6/2011 | Spector |
| 8,001,186 B2 | 8/2011 | Kordun |
| 8,112,391 B2 | 2/2012 | Allen et al. |
| 8,271,618 B1 | 9/2012 | Kridlo |
| 8,379,832 B1 | 2/2013 | Lyman |
| 8,396,205 B1 | 3/2013 | Lowry et al. |
| 8,806,024 B1 | 8/2014 | Toba Francis et al. |
| 8,843,616 B2 | 9/2014 | Ochoa |
| 8,959,572 B2 | 2/2015 | Yin |
| 9,077,804 B2 | 7/2015 | Kannan et al. |
| 9,106,736 B1 | 8/2015 | Slovacek |
| 9,172,806 B2 | 10/2015 | Tuchman et al. |
| 9,225,684 B2 | 12/2015 | Chandwani |
| RE45,959 E | 3/2016 | McCord et al. |
| 9,338,121 B2 | 5/2016 | Ciancio-Bunch |
| 9,356,896 B2 | 5/2016 | Jesse et al. |
| 9,515,976 B2 | 12/2016 | Talwar et al. |
| 9,521,259 B2 | 12/2016 | Davis et al. |
| 9,569,751 B2 | 2/2017 | Steiner et al. |
| 9,661,023 B1 | 5/2017 | Fang |
| 9,807,040 B2 | 10/2017 | Mendiola et al. |
| 9,826,095 B2 | 11/2017 | D'Arcy et al. |
| 9,843,681 B2 | 12/2017 | Tuchman et al. |
| 9,911,133 B1 | 3/2018 | Walbran |
| 9,930,179 B2 | 3/2018 | Steiner et al. |
| 9,984,061 B2 | 5/2018 | Isensee et al. |
| 10,187,459 B2 | 1/2019 | Luo |
| 10,193,928 B2 | 1/2019 | Singleton |
| 10,275,448 B2 | 4/2019 | Isensee et al. |
| 10,320,971 B2 | 6/2019 | Ghuli et al. |
| 10,346,785 B2 | 7/2019 | Tamblyn et al. |
| 10,445,335 B2 | 10/2019 | Kohan |
| 10,601,991 B1 | 3/2020 | Braddick |
| 10,601,992 B2 | 3/2020 | Dwyer et al. |
| 10,671,337 B2 | 6/2020 | Khalatian et al. |
| 10,671,977 B2 | 6/2020 | Caldwell et al. |
| 10,693,923 B2 | 6/2020 | Abiezzi |
| 10,694,040 B1 | 6/2020 | Jiron et al. |
| 10,997,557 B2 | 5/2021 | Frank et al. |
| 11,423,448 B2 | 8/2022 | Udupa et al. |
| 2003/0033369 A1 | 2/2003 | Bernhard |
| 2003/0078985 A1 | 4/2003 | Holbrook et al. |
| 2003/0097361 A1 | 5/2003 | Huang et al. |
| 2004/0024794 A1 | 2/2004 | Jain et al. |
| 2004/0243617 A1 | 12/2004 | Bayyapu |
| 2005/0053018 A1 | 3/2005 | Hoppe-Boeken et al. |
| 2006/0126817 A1 | 6/2006 | Beckett, II |
| 2006/0256954 A1 | 11/2006 | Patel et al. |
| 2007/0198284 A1 | 8/2007 | Korenblit et al. |
| 2007/0203797 A1 | 8/2007 | Annadata et al. |
| 2008/0016831 A1 | 1/2008 | Cheng |
| 2008/0240404 A1 | 10/2008 | Conway et al. |
| 2009/0035736 A1 | 2/2009 | Wolpert et al. |
| 2011/0223574 A1 | 9/2011 | Crawford et al. |
| 2012/0030298 A1 | 2/2012 | Bells et al. |
| 2013/0039483 A1 | 2/2013 | Wolfeld et al. |
| 2013/0086153 A1 | 4/2013 | Vendrow |
| 2013/0176413 A1 | 7/2013 | Lowry et al. |
| 2013/0218922 A1 | 8/2013 | DeLuca et al. |
| 2015/0180845 A1 | 6/2015 | Uomini |
| 2017/0319112 A1 | 11/2017 | Schmelzeisen-Redeker |
| 2018/0083898 A1 | 3/2018 | Pham |
| 2018/0167453 A1 | 6/2018 | Luo |
| 2020/0099790 A1 | 3/2020 | Ma et al. |
| 2020/0111377 A1 | 4/2020 | Truong et al. |
| 2020/0364724 A1 | 11/2020 | Pulugurtha et al. |
| 2020/0394590 A1 | 12/2020 | Kaimal et al. |
| 2022/0182492 A1 | 6/2022 | Skinner et al. |
| 2023/0319188 A1 | 10/2023 | Skinner |
| 2023/0362260 A1 | 11/2023 | Skinner |

OTHER PUBLICATIONS

Office Action for U.S. Appl. No. 17/378,204, dated Sep. 15, 2022, Skinner, "Contact Center Messaging", 13 Pages.
Office Action for U.S. Appl. No. 17/378,204, dated May 11, 2022, Skinner, "Contact Center Messaging", 12 pages.
Office Action for U.S. Appl. No. 18/207,086, mailed on Jan. 19, 2024, Chad Skinner, "Monitoring Representatives in a Contact Center Environment", 7 pages.

INTEGRATED REPRESENTATIVE PROFILE DATA IN CONTACT CENTER ENVIRONMENT

RELATED APPLICATIONS

This application claims priority to and is a non-provisional of U.S. Patent Application No. 63/079,051, filed Sep. 16, 2020, and entitled "INTEGRATED REPRESENTATIVE PROFILE DATA IN CONTACT CENTER ENVIRONMENT," the disclosure of which is incorporated by reference herein in its entirety for all purposes.

BACKGROUND

Large organizations often use automated contact centers to handle interactions between representatives of the organization and customers or other parties. Different types of organizations, including businesses, government agencies, and educational institutions may use automated contact centers for sales, customer service, technical and software support, problem resolution, and the like. Automated contact centers may be small or large-scale, depending on the amount of customer traffic and the structure of the organization. Large-scale contact centers, for example, may include representatives in different roles and/or different departments, using client systems that are distributed across different data centers, geographic locations, and/or networks. In some cases, a customer call or other contact (e.g., video or chat session) into the contact center may be answered first by an automated computer system which requests a series of inputs from the customer to determine where the contact is to be routed.

The various hardware, network, and software components of a contact center may be operable to support interactive communication sessions between customers and organization representatives, each operating independently on the separate computing devices. Different contact center environments may support different combinations of interactive communication session types and/or media types, including external or internal voice sessions (e.g., telephony-based), video sessions, chat sessions, email communications, social media-based sessions, etc. Some contact centers support targeted routing of contacts to different queues and/or specific representatives based on customer or contact attributes (e.g., media type, geographic location, language, etc.) as well as the customer's responses to automated phone menus, voice response units, conversation bots, and the like. Additionally, some contact centers use automated tools to assist representatives in managing the interaction with the customer during a live contact, such as automated prompting of cross-selling or upselling opportunities, on-the-fly sentiment analysis tools, escalation guidelines, etc.

In conventional contact centers, data relating to the workforce of representative users that interact with customers is often stored within multiple disparate systems internal and external to the contact center. For instance, for a single representative user, employee data for the representative may be stored in employee databases and human resources systems of the organization, configuration data for the interactive communication sessions handled by the representative may be stored by external communication service providers, contact history and performance metrics for the representative may be stored in a contact data store, and licenses and/or other attributes for the representative may be stored in other internal and/or external systems, and so on. These separate storage systems for representative profile data in conventional contact centers create difficulties in managing and analyzing the data when performing contact center operations. For example, conventional contact centers often require multiple points of contact including different combinations of automated and manual steps to add or modify representative profile data for the contact center. Additionally, different external communication services store and manage representative profile data differently, thus requiring a significant effort by contact center personnel to update the representative profiles or the change communication service providers. Further, the disparate storage of representative profile data, including data stored on both external and internal systems, makes it difficult or impossible for conventional contact centers to leverage and analyze this data in a performant manner for contact center operations such as contact queuing and management.

SUMMARY

To address these and other problems and inefficiencies, this disclosure describes various systems and techniques for building and using representative data systems within contact centers that store and manage representative profile data associated with multiple internal and external data sources. The representative data system integrates with external communication services and other internal/external systems used by the contact center, providing a uniform data store and interface from which representative profiles are created and managed. Additional techniques described herein include using integrated representative data systems within the contact center infrastructure to retrieve and analyze representative profile data during runtime contact center operations (and/or processes) such as contact queuing processes, contact management processes, workforce management processes, etc. As described below, a representative data system also may be implemented using relational or graph-based data structures to support advanced predictive modeling and impact analysis of scenarios such as service outages, dynamic workload shifting, infrastructure changes, and workforce changes.

In an example of the present disclosure, a contact center server includes one or more processors, and one or more non-transitory computer-readable media storing computer-executable instructions that, when executed by the one or more processors, cause the one or more processors to perform operations comprising receiving first data associated with a representative user from an interactive communication service executing outside of the contact center server, receiving second data associated with the representative user from a data source associated with the contact center server, storing the first data and the second data in a data store within the contact center server, receiving, from an internal operational system associated with the contact center server, a request to execute a function, retrieving data including at least one of the first data or the second data from the data store, and executing the function using the first data retrieved from the data store, wherein executing the function does not include retrieving data from interactive communication service after receiving the request to execute the function.

In another example of the present disclosure, a method includes receiving, by a contact center server, first data associated with a representative user from an interactive communication service executing outside of the contact center server, receiving second data associated with the representative user from a data source associated with the contact center server, storing the first data and the second data in a data structure associated with the representative user within the contact center server, receiving, from an internal operational system associated with the contact center server, a request to execute a function, retrieving data including at least one of the first data or the second data from the data structure, and executing the function using the first data retrieved from the data store, wherein executing the function does not include retrieving data from interactive communication service after receiving the request to execute the function.

Yet another example of the present disclosure includes one or more non-transitory computer-readable media storing instructions executable by a processor, wherein the instructions, when executed, cause the processor to perform various operations. Such operations include receiving, by a contact center server, first data associated with a representative user from an interactive communication service executing outside of the contact center server, receiving second data associated with the representative user from a data source associated with the contact center server, storing the first data and the second data in a data structure associated with the representative user within the contact center server, receiving a request to execute a function associated with the representative user, retrieving data including at least one of the first data or the second data from the data structure associated with the representative user, and executing the function using the data retrieved from the data structure.

DETAILED DESCRIPTION

Figure 1:
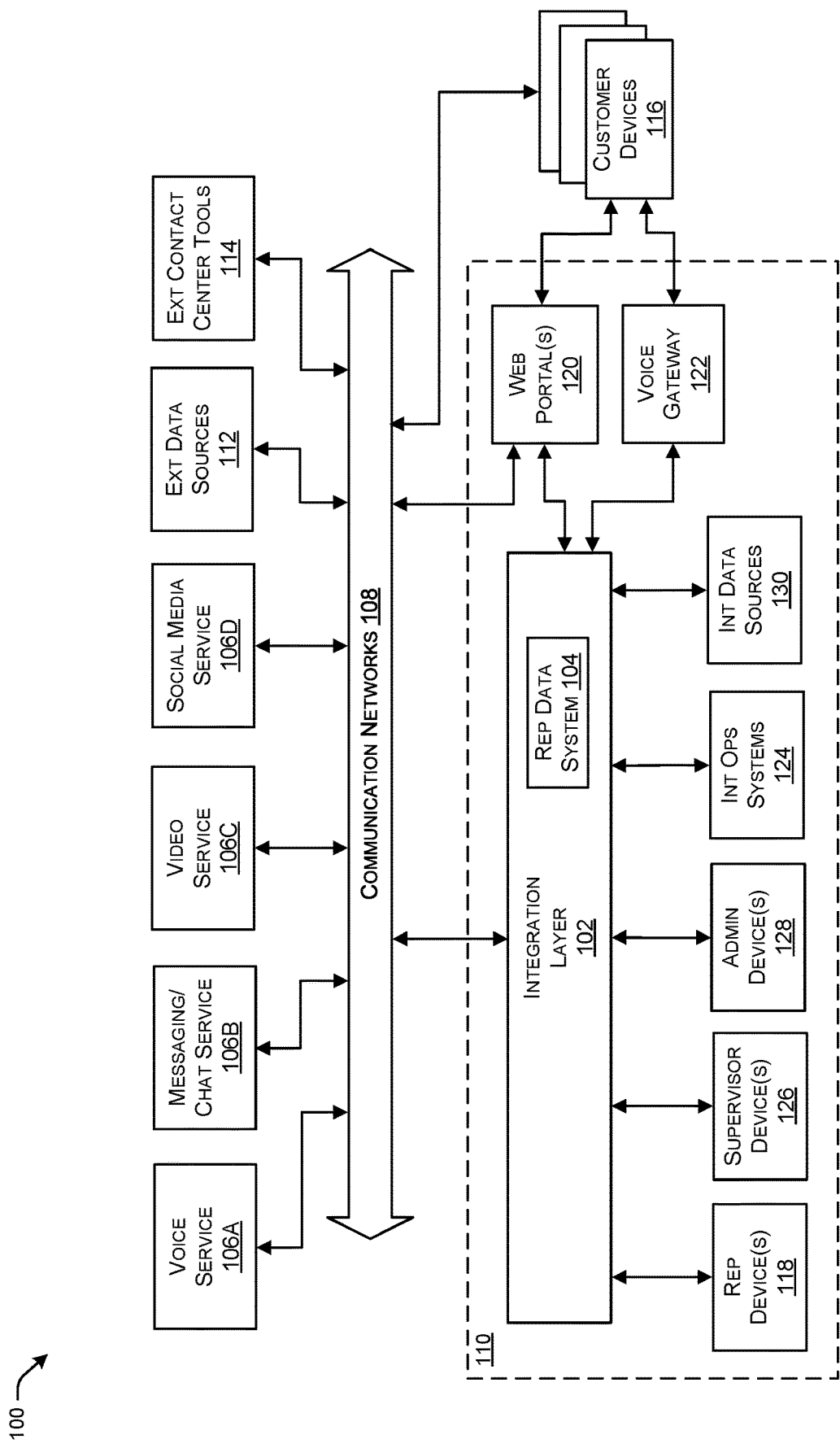
FIG. 1 illustrates a computing environment associated with a contact center, including various internal and external computer systems, services, and user devices, in accordance with one or more examples of the present disclosure.

FIG. 1 illustrates an example computing environment associated with a contact center 100. As shown in this example, contact center 100 includes an integration layer 102 comprising a representative data system 104. As described below in more detail, representative data system 104 is configured to store and manage representative profile data from various different systems and data sources associated with the contact center 100. The representative data system 104 also integrates with external communication services 106 and various other internal and external systems via communication networks 108, to provide a single point of contact and unified interface for accessing and modifying representative profiles, supporting various runtime contact center operations, and performing advanced predictive modeling and impact analysis for the contact center 100.

Contact centers as described herein may include fully automated and/or semi-automated contact center environments. In this example, dotted box 110 identifies the internal components of the contact center 100, and the components outside of the dotted box 110 represent external components associated with the contact center 100. As used herein, an internal component of a contact center may refer to a component (e.g., computer server or device, network component, software service, application, etc.) that is controlled by the organization operating the contact center. In contrast, an external component of the contact center may refer to a component that interacts with at least one internal component of the contact center, but which is not controlled by the organization operating the contact center. As shown in this example, the external components associated with the contact center 100 may include a number of external communication service providers 106A-106D (collectively "service providers 106"), additional external data sources 112, and external software-based 114 provided by third-party entities to perform contact center functionality. Additional external components of the contact center 100 may include the communication network(s) 108 and customer devices 116 that communicate in interactive sessions with representatives (e.g., employees) of the organization associated with the contact center 100.

In various implementations, the internal components of the contact center 100 may reside within a single server and/or single data center operating at a geographic location. In such cases, some or all of the internal components of the contact center may communicate via a secure private network such as a private LAN or secure corporate network protected by a firewall. In other implementations, the internal components may be distributed across multiple servers and/or multiple data centers that operate at different geographic locations. Internal components that are distributed across data centers may communicate via secure private networks and/or via unsecure public networks (e.g., the Internet) and may use tunneling and encryption technologies. As illustrated, the internal and external components of the contact center may communicate via communication networks 108, including but not limited to computer networks (e.g., TCP/IP networks, etc.), wireless networks (e.g., Long-Term Evolution (LTE), 5G, a Universal Mobile Telecommunications Service (UMTS), Global System for Mobile communications (GSM) networks, etc.), satellite networks, and the like.

In operation, contact center 100 may be implemented via the computing environment shown in FIG. 1 to provide interactive communication sessions (or interactive sessions) between customers using various types of customer devices 116, and representatives of the organization using representative client devices 118 ("representative devices 118"). Customer devices 116 and/or representative devices 118 may include any personal computing devices, such as desktop or laptop computers, mobile devices (e.g., smartphones, tablet computers, etc.), wearable computing devices, or any other device capable of communicating over communication network(s) 108. In some scenarios, a customer, client, or other individual associated with the organization may use a customer device 116 to contact the organization via a point-of-contact service, such as web portal(s) 120 or voice gateway 122. In some examples, the contact center 100 may support different services associated with different communication types, such as the web portal 120 to process web chat requests received via a help/chat link on the organization's web site, a voice gateway 122 to process voice calls received via a telephone network and/or Voice over IP (VOIP) calls. Although only two customer portals/gateways are shown for the contact center 100 in this example, any number of additional customer portals/gateways may be used in other implementations, such as portals or gateway services for voice communications from customer devices 116, video communications, messaging/chat communications, social-media based communications, customer relationship management (CRM) based communications, etc.

After a customer device 116 initiates communication with the contact center 100, or vice versa, the contact center 100 may assign the customer to a representative and initiate an interactive session between the customer device 116 and the representative device 118 of the assigned representative. Interactive sessions may include voice sessions, video sessions, messaging/web chat sessions, social media sessions, and/or CRM sessions, etc. As shown in this example, the contact center 100 may use external service providers 106 to implement the functionality of providing the interactive sessions between customer devices 116 and representative devices 118. For instance, contact center 100 uses a first external voice service provider 106A, a second external messaging/chat service provider 106B, a third external video service provider 106C, a fourth external social media service provider 106D, and so on. In various examples, the contact center 100 may use any combination of external or internal communication service providers.

Along with external communication service providers 106 that provide communication services to implement interactive sessions between customers and contact center representatives, the contact center 100 also includes external data sources 112 and external contact center tools 114 to provide and support additional features and functionalities of the contact center 100. External data sources 112 may provide data relating to specific individuals, including specific customers or specific representatives. For instance, external data sources 112 may include one or more of governmental databases, educational institutions, financial institutions, workplace databases, social media servers, and/or other third-party data sources. The external data retrieved for customers, representatives, and/or other individuals may include demographic data (e.g., age, occupation, marital status), geographic data (e.g., the individual's home state, county, or city, and/or current location), financial/purchase data (e.g., income, recent larges purchases, etc.), or life event data (e.g., recent marriages, divorces, children, etc.). External contact center tools 114 provide contact center-related functionality to the contact center 100, and may include software-based tools (e.g., processes) such as transcript generation and analysis tools, customer sentiment analysis tools, sales script tools, contact monitoring tools, hbonetwork monitoring tools, data analytics tools, workforce management tools, post-interactive session survey tools, etc. As with the communication service providers 106, the external data sources 112 and contact center tools 114 are depicted in this example as external components of the contact center 100, but some or all of these data sources and tools may be implemented via internal systems of the contact center 100.

As shown in this example, a customer may initiate communication via a web portal 120 or voice gateway 122, after which the contact center 100 components select a communication service provider 106A-106D based on the customer device 116 and communication type/media used by the customer, after which an interactive session is initiated between the customer device 116 and a selected representative client device 118. Although in this example the customer device 116 is depicted as initiating communication sessions by first contacting an internal component of the contact center (e.g., web portal 120 or voice gateway 122), in other examples the customer devices 116 may initially contact an external communication service provider 106 directly. For example, customer service links on an organization's web site may be hosted by and/or redirected to particular external service providers 106. In some cases, the customer communication into the contact center 100 may be answered first by an automated computer system (e.g., implemented by an external service provider 106 or an internal operational system 124), which requests and receives a series of inputs from the customer. Such automated systems may be implemented as voice response units for voice calls, conversation bots for web chat sessions, etc. The inputs requested from the customer via an automated system may include data identifying the customer (e.g., customer name, account number, ticket number, etc.), the purpose of the contact (e.g., a question type, a product model, etc.), or the language or geographic region of the customer, and the like. Based on the customer's responses, the automated system may determine where to direct the customer for an interactive session, for instance, to a particular data center, department of the organization, a representative having a particular role, criteria, or credentials, or to a particular representative that has had previous contact with the customer.

In some examples, the internal operational systems 124 of the contact center 100 (e.g., preprocessing, queuing, routing, etc.) may be used to select an external service provider 106 and initiate a communication session between the customer device 116 and a selected representative device 118, after which the internal operational systems 124 may extricate themselves from the communication channel and allow the selected external service provider 106 to manage the session. For example, internal operational systems 124 and/or components within the integration layer 102 may receive and analyze data associated with an incoming request for an interactive session from a customer device 116, determine a queue and/or select a representative to handle the contact, and assign the interactive session to a service provider 106 which initiates and manages the interactive session between the customer device 116 and representative device 118. The internal operational systems 124 and integration layer 102 of the contact center 100 also may receive and handle requests to transfer contacts from one representative to another, initiate multi-party interactive sessions, and escalate communication sessions with customers to supervisor devices 126 and/or administrator devices 128. The internal operational systems 124 and components within the integration layer 102 also may monitor and analyze the interactive sessions to determine performance metrics for individual representatives, teams, and for the contact center 100 as a whole, and to implement policies and instructions based on various models (e.g., contact quality models, efficiency models, workflow projection models, etc.).

The integration layer 102 generally provides a common interface between the internal systems and devices of the contact center 100 and the external service providers 106, external data sources 112, and external contact center tools 114. For example, representative devices 118, supervisor devices 126, and administrator devices 1128 may communicate with the external communication service providers 106, data sources 112, and tools 114 via components within the integration layer 102. In some cases, components within integration layer 102 support "plug-and-play" functionality among external service providers 106 and external contact center tools 114 by providing a common framework for interfacing with the external service providers 106 and tools 114, so that the client applications executing on representative devices 118 and other internal systems/devices within the contact center 100 may perform similar or identical operations regardless of which external service provider 106 is used. In such examples, the integration layer 102 may therefore provide technical advantages and improve the functioning of the contact center components by providing support for plug-and-play among external communication service providers 106 and third-party contact center tools 114, without requiring any software change within the client applications executing on the customer devices 116, representative devices 118 and/or other internal systems.

For instance, a voice service 106A provided by a third-party service provider for the contact center 100 may be replaced by a different voice service from a different third-party service provider, without requiring any functional change to the client applications executing within the representative device(s) 118, supervisor device(s) 126, administrator device(s) 128 or internal operational systems 124. Similarly, the integration layer 102 may interface with multiple different external service providers 106 for a single communication type (e.g., multiple different voice service providers 106A, multiple different messaging/chat service providers 106B, etc.) simultaneously, so the contact center 100 can use multiple external services for a single communication type at the same type, in a manner that is transparent with respect to both the external service providers 106 and the internal systems and devices of the contact center 100. In such cases, external communication service providers 106 may operate similarly or identically regardless of whether the contact center is using another service provider to provide an alternative communication service. Representative devices 118 and other internal systems within the contact center 100 also may operate similarly or identically regardless of which external communication service provider 106 is providing an interactive session for the representative device 118.

The integration layer 102 also may provide an interface between the internal components of the contact center 100 (e.g., representative devices 118, supervisor devices 126, administrator devices 128, internal operations systems 124, and internal data sources 130) and the external data sources 112 and/or contact center tools 114 which operate as services or applications external to the contact center 100. For instance, the internal operational systems 124 (e.g., queuing systems, contact management systems, workforce management systems, etc.) may access external tools 114 such as data analytics tools, workforce management tools, etc., via the integration layer 102. Representative devices 118 also may access external tools 114 such as customer sentiment tools, post-interactive session survey tools, etc., via the integration layer 102 during an interactive session with a customer device 116. As noted above, the integration layer 102 may provide a unified common interface for accessing external data sources 112 and contact center tools 114, so that various external (e.g., third-party) data sources and tools may be added, removed, replaced, or upgraded, without requiring any changes to the application executing within the contact internal components of the contact center 100.

The integration layer 102 also provides a unified common interface between the internal devices and systems within the contact center 100. For example, representative devices 118 may communicate via the integration layer 102 with other representative devices 118, internal operational systems 124, supervisor devices 126, administrator devices 128, and/or internal data sources 130. For instance, internal operational system 124 may be implemented on computer servers of the contact center 100 to provide functionalities for contact queuing, monitoring, analysis, and modeling within the contact center 100. As described below, representative devices 118 may communicate with internal operational systems 124 via the integration layer 102, allowing the operational systems 124 to receive data regarding interactive sessions executed on the representative devices 118, analyze and/or model the data, and determine operating instructions to transmit to representative devices 118, supervisor devices 126, etc., to implement operational models (e.g., rules and/or policies) across the contact center 100. Such models may include quality control models, workforce management models, contact center efficiency models, etc.

As illustrated by these examples and the other examples described herein, the integration layer 102 provides additional technical advantages within contact center environments, including improving the functioning and efficiency of representative devices 118 and internal operational systems 124. For instance, the integration layer 192 may provide a common queuing framework capable of managing the work queue(s) for representative devices 118 (e.g., live customer contact queues, deferred work item queues, etc.) received from various external and internal contact center services. The integration layer 102 also may provide internal operational systems 124 with detailed data regarding interactive sessions from many representative devices 118 in a consistent and uniform manner, allowing the internal operational systems 124 to analyze the data and improve the performance, contact quality, and workflow across the contact center 100. Internal operational systems 124 also may include rules engines using heuristics and/or trained machine-learned models to analyze the interactive session data received from representative devices 118, and may transmit instructions and/or policies to other internal devices and systems within the contact center 100 to implement such policies.

As noted above, the representative data system 104 may store and manage representative profile data from the various external and internal data sources and systems of the contact center 100. The representative data system 104 may provide the integration layer between the internal devices and systems of the contact center 100 and the external communication services 106, external data sources 112 and external contact center tools 114. In this example, the representative data system 104 is depicted as a separate internal component within the integration layer 102 of the contact center 100. In such examples, the representative data system 104 (and/or the integration layer 102) may include one or more dedicated computer servers and/or software applications or services configured to perform the functionalities of the representative data system 104 described herein. In other examples, the representative data system 104 (and/or the integration layer 102) depicted in FIG. 1 may represent a conceptual layer in which some or all of the components and functionalities of the representative data system 104 described herein may be implemented within other internal or external devices and systems of the contact center 100. For instance, in some implementations the representative data system 104 may be integrated into the internal operational systems 124 and/or internal data sources 130, or into the external data sources 112 and external contact center tools 114 of the contact center 100. Additionally or alternatively, a representative data system 104 may be implemented within each individual representative device 118 to store, manage, and analyze the representative profile data for the individual representative(s) associated with the representative device 118.

Figure 2:
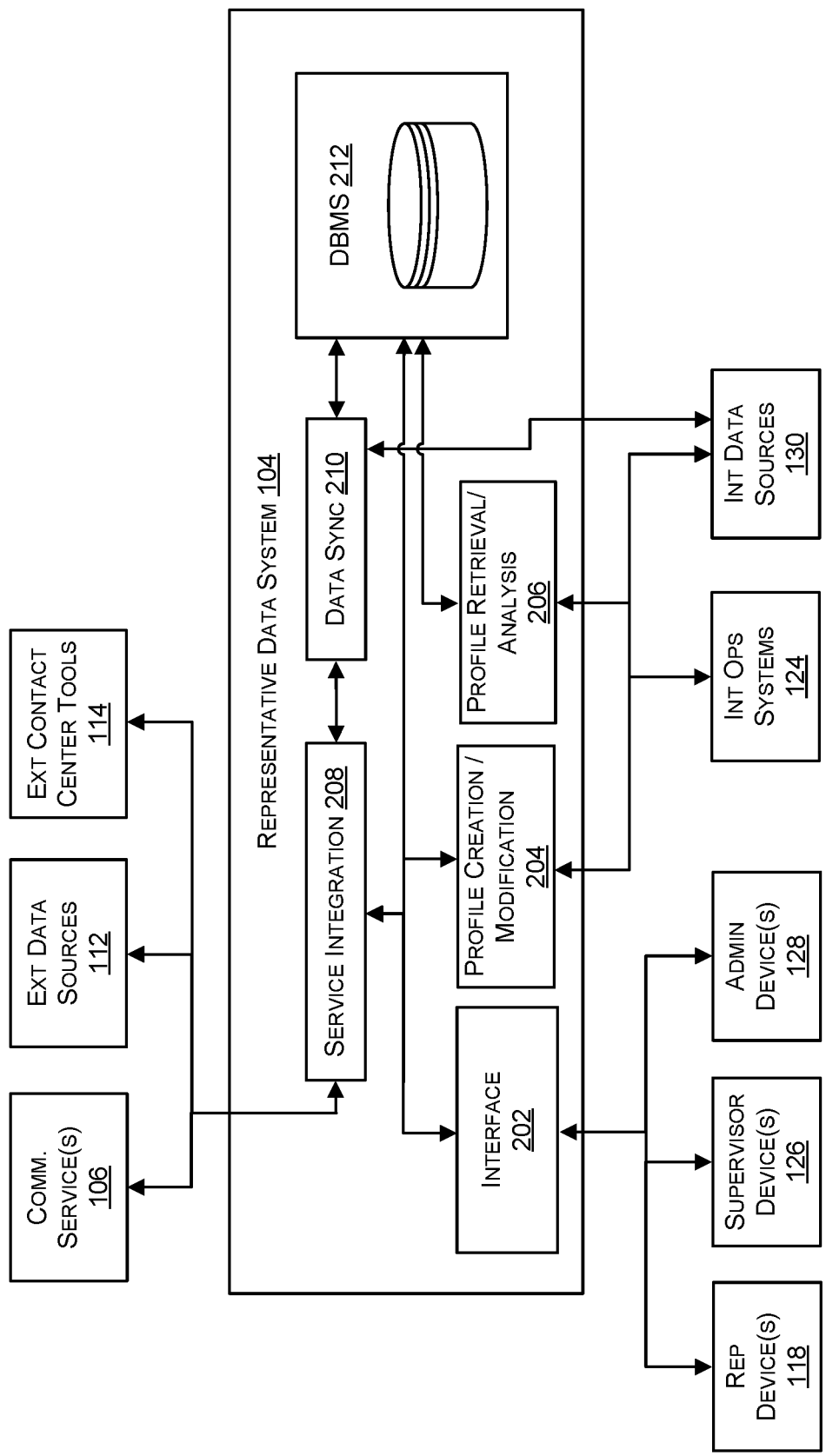
FIG. 2 illustrates an example representative data system and related components within a contact center environment, in accordance with one or more examples of the present disclosure.

FIG. 2 illustrates an example representative data system 104 and related components that may be used within a contact center 100. The representative data system 104 may be similar or identical to the representative data system 104 described above, with certain additional components illustrated and described below. In this example, the representative data system 104 includes an interface component 202, a profile creation/modification component 204, a profile retrieval/analysis component 206, a service integration component 208, and a data synchronization component 210. Additionally, a database management system (DBMS) 212 is shown including one or more databases or other data structures, and the associated database software components for storing, retrieving, and managing representative profile data within the representative data system 104.

The representative data system 104 stores and manages representative profile data received from various different systems and data sources of the contact center 100, including external communications services 106, external data sources 112, and external contact center tools 114, along with internal operational systems 124 and internal data sources 130. As described below, the representative data system 104 receives various requests relating to representative profile data via the interface component 202, profile creation/modification component 204, and profile retrieval/analysis component 206, and then adds, removes, updates, or retrieves representative profile from the DBMS 212 based on the request. Additionally, the representative data system 104 uses the service integration component 208 to integrate with the various external (and/or internal) services and systems in a manner that is seamless and transparent with respect to the other components within the representative data system 104 and within the contact center 100 as a whole.

The interface component 202 receives and handles requests from various client devices (e.g., representative device(s) 118, supervisor device(s) 126, and/or administrator device(s) 128) in the contact center 100. The interface component 202 of may include one or more user interfaces and/or application programming interfaces (APIs) to support the web browsers or client applications executing on the various client devices. The requests received from client devices via the interface component 202 may include requests to add a new representative user within the contact center 100, remove a representative user, retrieve or update the profile data of a representative user, and/or to analyze various representative profile data associated with one or more representative users. Along with the APIs or graphical user interface (GUI) components to support to the client applications and/or web browser-based front ends on the client devices, the interface component 202 also may include authentication components and functionality to allow a user to add, update, delete, and retrieve any representative profile data for which that user is authorized to access. As an example, a representative accessing the interface component 202 through a representative device 118 may have credentials permitting the representative to view all the representative's own profile data, and a subset of public data associated with other representatives of the contact center 100. A supervisor (or manager, team lead, etc.) that accesses the interface component 202 through a supervisor device 126 may have a different set of credentials that allow the supervisor to create new representatives within that supervisor's team, and to view and/or modify any of the profile data associated with the representatives within their team. A system administrator accessing the interface component 202 through an administrator device 128 may have a still different set of credentials that permit the administrator to change representative team structures/hierarchies, to associate or dissociate representatives or teams with different communication service providers 106, and to execute various software operations (e.g., external contact center tools 114, internal operational systems 124, etc.) that are available within the contact center 100.

Thus, through the interface 202, different users operating different client devices, including users/devices that may be internal or external to the contact center 100, are provided with the security infrastructure and functionality to retrieve and/or modify the representative profile data for which those users are authorized to retrieve and/or modify. In some examples, the interface component 202 may provide a GUI to display a view of representative profile data associated with a single representative or group of representatives. For instance, in response to the request from a client device, the interface component 202 may retrieve representative profile data from the DBMS 212' associated with a representative (or multiple representatives) and may generate and output a user interface including the retrieved representative profile data. In some cases, a single view and/or single user interface from the interface component 202 includes profile data for a representative (or multiple representatives) associated with external communication service(s) 106, external data sources 112, external contact center tools 114, internal operational systems 124, and/or internal data sources 130. Thus, the interface component 202 may provide a single point of contact and unified interface, via GUIs and/or APIs, to allow authorized users to access and modify representative profiles. In some examples, the interface component 202 also may provide the interface components (e.g., GUIs and/or APIs) to allow authorized users to perform various runtime contact center operations such as contact routing or re-queuing, contact management, representative/workforce management operations, etc., as well as interface components to perform advanced predictive modeling and impact analysis for the contact center 100.

The profile creation/modification component 204 and/or the profile retrieval/analysis component 206 may receive and handle additional requests relating to representative profile data from the internal operational systems 124 and the internal data sources 130 of the contact center 100. Although this example shows requests form the internal operational systems 124 and the internal data sources 130 following a different processing path than the requests from client devices, in other examples APIs within the interface component 202 may receive and handle requests form the internal operational systems 124 and the internal data sources 130 as well.

Requests from internal operational systems 124 may include, for example, requests to retrieve or update representative profile data during runtime contact center operations such as contact queuing/routing operations, contact analysis and management operations, representative re-assignment and workforce management operations, contact center tuning and optimization operations, etc. Any of these operations or any other internal operational system 124 within the contact center 100 may retrieve representative profile data by transmitting a request to the profile retrieval/analysis component 206, or may create/modify representative profile data by transmitting a request to the profile creation/modification component 204. Additionally, because the representative data system 104 stores the representative profile data in a single local DBMS 212, the requests from the internal operational systems 124 may be handled quickly to support runtime execution of performant and time-sensitive contact center operations such as contact queuing/routing, contact management, etc.

Requests from internal operational systems 124 also may include advanced operations such as predictive modeling and impact analyses within the contact center 100. Accordingly, internal operational systems 124 executing complex scenarios such as service outages, dynamic workload shifting, infrastructure changes, and workforce changes, may retrieve and use representative profile data in such analyses by transmitting requests to the profile retrieval/analysis component 206.

Additionally, the profile creation/modification component 204 and/or the profile retrieval/analysis component 206 may receive requests from internal data sources 130. These requests may indicate that data associated with one or more representative users of the contact center 100 have been changed via one or more internal systems/data sources of the organization, such as change in the representative's employee data within an employee database or human resource systems of the organization. In these examples, the profile retrieval/analysis component 206 may update the corresponding representative profile data within the DBMS 212. As discussed below, the modification of the representative profile data also may trigger additional modifications to other data tables or nodes within the DBMS 212 and/or external systems, and/or may trigger the execution of one or more internal operational systems 124 to perform an updated contact center operation based on the updated representative profile data.

When the representative data system 104 receives a request, for example via the interface component 202, the profile creation/modification component 204, or the profile retrieval/analysis component 206, the request may include one or more additions, modifications, and/or retrievals of representative profile data. For example, when the interface component 202 implements a GUI or API to provide representative profiles to users on client devices, the interface component 202 may retrieve the representative profile data from the DBMS 212. When the user updates the representative's profile via the GUI or API, the interface component 202 modifies the corresponding representative profile data in the DBMS 212. As another example, when an internal operational system 124 configured to perform runtime contact queuing and/or contact management requests representative profile data, the profile retrieval/analysis component 206 may query the DBMS 212 to retrieve profile data for a number of different representatives in the contact center 100. The profile retrieval/analysis component 206 may return the profile data to the internal operational system 124, which uses the profile data to perform the contact queuing or contact management determination, etc. As yet another example, a different internal operational system 124 may be configured to reassign representatives to different queues in order to optimize representative workforce in the contact center 100. In this example, the internal operational system 124 first may use the profile retrieval/analysis component 206 to query the DBMS 212 for representative profile data, and then may use the profile creation/modification component 204 to modify the representative queue assignments within the DBMS 212.

As discussed above, the interface component 202 and the profile creation/modification component 204 may handle requests that include adding, removing, or modifying profile data for one or more representatives in the contact center 100. In various examples, some or all of the profile data for the representatives may be stored in a data store such as DBMS 212. Although the DBMS 212 in this example is depicted as a single data store residing within the representative data system 104, in other examples the DBMS 212 may include a distributed data store in which some or all of the data store resides on separate systems within the contact center 100. Additionally, as discussed below the DBMS 212 may include a relational database management system (or relational database system) and/or a graph database management system (or graph database system) configured to store the representative profile data in various examples.

The representative profile data stored in the DBMS 212 may include any or all of the data generated or received by the various internal and external systems and data sources of the contact center 100. For example, the DBMS 212 may receive and store any personnel/employee relating to representatives from internal data sources 130 such as organization employee databases, human resources systems, and other internal systems of the organization. Such data may include the representative's job title(s) at the organization and the start dates associated with the titles. The data from internal data sources 130 stored in the DBMS 212 also may include the representative's level, team, department, supervisor, mentor, etc., as well the representative's permissions or security credentials to access, view, and update different internal data or execute different internal operations of the contact center 100. Additionally, the data may include the representative's skills, licenses, credentials, and/or personality traits with respect to contact handling in the contact center 100, or internally collected performance metrics for the representative with respect to contact management (e.g., average contact time, average hold time, escalation rate, customer satisfaction metric, various success or failure metrics, etc.).

The DBMS 212 also may receive and store representative data from one or more external communication services 106. For instance, an external communication service 106 may transmit to the DBMS 212 its configuration settings, security/permissions settings, contact handling metrics, etc., for each representative in the contact center 100 associated with that communication service. The DBMS 212 may also store representative data received from various additional external data sources 112 and/or external contact center tools 114. For instance, external data sources 112 such as educational data sources, governmental data sources, financial data sources, demographic data sources, third-party credentialing data sources, etc., may transmit data associated with contact center representatives to the DBMS 212. Additionally, external contact center tools 114 may transmit to the DBMS 212 contact center performance metrics such as transcript analyses, representative and customer personality/sentiment data, etc., for any representatives in the contact center 100.

In various examples, the DBMS 212 may receive and store any combination of the representative profile data described herein from the different external communication services 106, external data sources 112, external contact center tools 114, internal operational systems 124, and internal data sources 130. Thus, data from these disparate storage systems may be integrated and stored within a single DBMS 212, allowing client applications and/or internal operational systems 124 to retrieve all of the relevant data for the representatives from a single data store internal to the contact center 100. As described below, the DBMS 212 within the representative data system 104 thus allows client applications to be more robust, and internal operational systems 124 to be more performant and capable of retrieving and analyzing representative profile data for runtime operations and/or advanced analytical operations.

Accordingly, whenever an operation performed by the representative data system 104 adds, removes, or modifies the representative profile data, the representative data system 104 may use the service integration component 208 and/or the data synchronization component 210 to make corresponding updates to the representative profile data in the other external/internal systems or data sources.

In some examples, the service integration component 208 includes a set of software-based components to access the various internal and external systems and data sources that may store or generate representative profile data. As noted above, each of the external communication services 106 may operate separately and independently from one another. Additionally, each external communication service 106 may store a unique set of representative profile data for the representatives associated with that service, and each may use its own data format, GUIDs, naming conventions, and the like. Accordingly, to support plug-and-play functionality within the contact center 100, the service integration component 208 may provide a common interface and point of access for each of the separate external communication services 106.

The service integration component 208 may include a library of software functions in some examples, that is configured to access APIs or other interfaces exposed by the external communication services 106. The software functions of the service integration component 208 may be configured to access and initiate data operations on each of the separate external communication services 106. The data operations may include data insertions, additions, retrievals, and the like of profile data associated with the representatives of the contact center 100. For example, in response to a request received from a client device via the interface component 202 to add/retrieve/update representative profile data, the service integration component 208 may use lookup tables to retrieve a set of GUIDs or other unique identifiers that are specific to the external service provider 106 and are associated with the particular representatives identified in the request. The service integration component 208 may use the unique identifiers to access the external service provider(s) 106 to add, remove, or update the representative profile data stored by the external service providers 106, so that it matches the data stored in the DBMS 212 that was updated based on the same request. In some cases, the service integration component 208 may assign an internal contact center identifier associated with the requested representative, and/or may request corresponding identifier(s) from one or more external service providers 106 on which a profile has been created for the representative. The service integration component 208 then may execute commands to instruct the external service provider(s) 106 to perform the requested data additional/retrieval/update for the representative(s) identified in the request.

Although the above examples relate to receiving and modifying profile data stored for representatives within the external service providers 106, the service integration component 208 may include similar functionality to receive and modify representative profile data within external data sources 112, external contact center tools 114, and internal data sources 130. For instance, when the representative data system 104 updates any representative profile data within the DBMS 212, it may use the service integration component 208 to perform corresponding updates to the data associated with the same representative(s) within any of the other external or internal data sources or systems described herein, thus ensuring that the DBMS 212 remains in sync with the various disparate sources of representative profile data.

As these examples illustrate, the service integration component 208 may operate as a single point of contact through which the interface component 202, the profile creation/modification component 204, and/or any other system within the contact center 100 may access and modify externally stored profile data for the representatives associated with the contact center 100. For instance, when an administrator or information technology user of the contact center 100 determines that a voice service provider 106A, messaging/chat service provider 106B, or video service provider 106C should be added, removed, or replaced within the contact center architecture, the necessary software updates may be made within the service integration component 208 so that little or no changes are required with the client applications are internal operational systems 124. Similarly, any changes to the external data sources 112 or external contact center tools 114 used by the contact center 100 may be implemented within the service integration component 208, in a manner that is partially or fully transparent with respect to all other internal and external systems of the contact center 100.

In some examples, the representative profile data stored externally to the representative data system 104 may be updated independently, or without a request being made to the representative data system 104. As an example, each of the external service providers 106, external data sources 112, and external contact center tools may operate separate and independent systems outside of the control of the contact center administrators, and may independently modify their representative profile data without receiving instructions from the representative data system 104. For instance, a representative may interact directly with an external service provider 106 to change his configuration settings, or a third-party credentialing system may update a credential/license for a representative without her knowledge, and so on.

In these examples, the data synchronization component 210 may receive any such independent changes to the representative profile data (e.g., changes not made via requests through the interface component 202, profile creation/modification component 204, or profile retrieval/analysis component 206), and may update the DBMS 212 accordingly to maintain data consistency with any external systems or data sources. In some cases, the data synchronization component 210 may periodically query the external systems (e.g., external service providers 106, external data sources 112, and external contact center tools 114), via the service integration component 208, to retrieve any updated representative profile data. Additionally or alternatively, the data synchronization component 210 may receive push notifications via the service integration component 208 from any of these external systems, or may receive push notifications from internal data sources 130, in response to changes to representative profile data. The data synchronization component 210 then may update the representative profile data stored in the DBMS 212 to match the updated data received from the external systems.

In some cases, the data synchronization component 210 may execute one or more internal operational systems 124 in response to receiving updated representative profile data from an external system. For instance, if the data synchronization component 210 receives updated configuration data from an external communication service 106 of the contact center 100 indicating that a particular representative has changed certain configuration settings (e.g., working hours, client device/media type, subject matter of calls to handle, etc.), then the data synchronization component 210 may perform corresponding updates within the DBMS 212 and other external systems associated with that representative. The data synchronization component 210 also may initiate an internal operational system 124 to reallocate other representatives, alter the queue assignments, etc., based on the updated representative data received from the external system.

Figure 3:
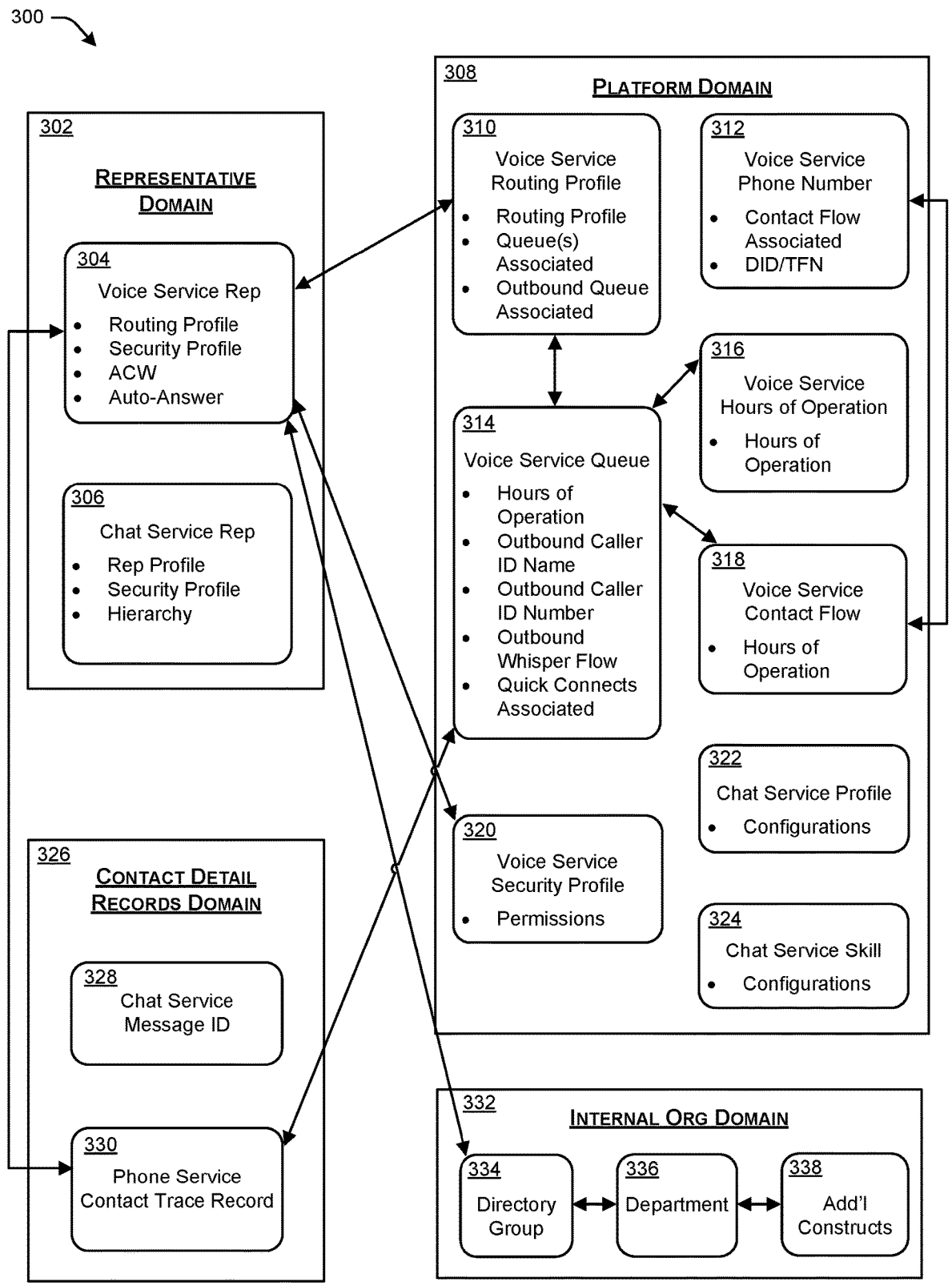
FIG. 3 illustrates an example representative data schema in accordance with one or more examples of the present disclosure.

FIG. 3 illustrates an example of a data schema 300 that may be used to store representative profile data in some implementations of the representative data system 104. The data schema 300 may be implemented within a single DBMS 212 within the representative data system 104, and/or within multiple different DBMSs in a distributed storage system. In this example, the schema 300 includes four different domains, each containing a set of nodes within the overall schema 300 used to store the representative profile data. Each domain and node in this example may correspond to a separate data structure within the DBMS 212. As noted above, the DBMS 212 may be implemented via a relational database and/or a graph-based data management system. When the DBMS 212 is a relational DBMS, the different domains in schema 300 may correspond to databases, and the nodes within the domains may correspond to tables. For a graph-based DBMS 212, the graph structure may be less deterministic and more data driven, where each node in the schema 300 corresponds to a node in the graph database and the data-driven relationships between nodes define the graph edges.

In this example, the representative domain 302 includes a voice service representative node 304 and a chat service representative node 306. The platform domain 308 includes a voice service routing profile node 310, a voice service phone number node 312, a voice service queue node 314, a voice service hours of operation node 316, a voice service contact flow node 318, a voice service security profile node 320, a chat service profile node 322, and a chat service skill node 324. The contact detail records domain 326 includes a chat service message identifier node 328 and a phone service contact trace record 330. The internal organization domain 332 includes a directory group node 334, a department node 336, and an additional constructs node 338.

The schema 300 shown in this example is illustrative only, and in other examples the schema 300 may include different data designs and/or hierarchical data structures including any combination of the representative profile data described herein. For instance, different implementations of data schema 300 may incorporate any of the representative profile data associated with any external communication service provider 106, external data source 112, external contact center tool 114, internal operational system 124, and/or internal data source 130.

FIG. 3 also depicts arrows identifying illustrative relationships between data nodes within the schema 300. For instance, the voice service representative node 304 is linked by an arrow to the voice service security profile node 320, indicating a data dependency or other relationship between the security profile data in the voice service representative node 304 and the permissions data in the voice service security profile node 320. In some examples, when DBMS 212 is implemented as a relational data store, the relationships represented by the arrows in schema 300 may be implemented as database keys or other inter-table relationships. In other examples, when DBMS 212 is implemented as a graph-based data store, the relationships represented by the arrows in schema 300 may be implemented as edges in the graph structure, and the DBMS 212 may traverse the edges in the graph database to identify the related data. For both relational and graph DBMSs, the DBMS 212 may maintain the data integrity of the schema 300 by propagating any data updates to any other related and dependent data tables or nodes within the schema 300.

As noted above, using a graph-based DBMS (or graph DB) for storing, accessing, and analyzing representative profile data may provide various technical advantages over non-graph DB systems, as well as over various other representative profile data storage system. For instance, a graph DB representative profile structure may be less deterministic and more data driven, without a rigid and inflexible schema. Within a representative profile graph DB, each node containing an attribute of representative data may correspond to a node in the graph DB, and the graph edges may correspond to data-driven relationships between nodes. For example, certain nodes within a representative profile graph DB may store hierarchical relationships within the organization (e.g., managers, team, subordinates, etc.), other nodes may store skills, proficiencies, and queue assignments. Such graph DBs may support any number of groupings/combinations that can be applied flexibility within the graph framework, allowing for developing flexible queries for any combination of representative skills, organization, profile data, contact attributes/claim types, geographic region, organization goals, customer flight risk, and the like.

Representative profile data implemented as graph databases also may readily support multi-tenant SaaS systems with multiple third-party entities that provide data for and/or access and use the representative profiles. Such systems allow for real-time queries on the representative data in the graph DB, but also support stream processing to allow the workflow management engines of tenants and other third-party systems to function. When a graph DB is used for representative profiles, the nodes and attribute sets may be defined, after which query programming, access interfaces, etc., may be generated to match the node and attribute sets. For instance, a query to determine a qualified representative to handle a contact may output ranked list of currently available responders based on the query results. Inputs may be used to dynamically build queries, not requiring the query programming, data schema, and access interfaces to be designed in advance, as in certain conventional database solutions. Instead, by using a graph DB for representative profiles, queries can be changed independently of the underlying data schema and access interfaces, and new nodes and attributes may be added quickly without breaking or requiring any modification to existing interfaces, applications, and queries.

In some examples, graph DB for representative profiles also may be time-based and may store temporal data representing previous representative profile states at previous points in time. In such examples, the nodes/attribute values for an individual representative may be queried for past points in time, allowing the query to retrieve the state of the representative profile at the previous points. In various implementations, the use cases for representative profiles stored as graph databases may include, for instance, real-time recommendation engines, master data management, knowledge management, fraud detection, contact center unified view, contact center security framework, contact center data segregation framework (e.g., by contact center, department, business unit/segment, etc.).

As noted above, using graph databases to implement representative profiles may provide a number of technical advantages that improve the functioning, security, and efficiency of the contact center. For instance, in contrast to relational database systems (e.g., DB2), graph databases are more flexible with respect to schema changes, the data structure, and building and deploying queries. Similarly, using graph DBs to implement representative profiles also provides additional flexibility to query across other indexes, from other data sources that may change frequency and without notice, to retrieve additional relevant data relating to the representative.

Additionally, using graph DBs to implement representative profiles also provides advantages in data segregation. For instance, when a representative profile stored is implemented as a multi-tenant SaaS graph DB, the different tenants and other entities may have different data schemas and different constraints with respect to data security, data integrity, data consistency, etc., which can change during the life of the system. Certain conventional system may use techniques such as complex nested security groups to manage these schemas and constraints. Graph DBs, in contrast, provide the flexibility to allow entity and/or organization relationships, and their relationships and the corresponding data, constraints, etc., to be changed quickly and without impacting other tenants or entities using the system. The multi-tenant/entity relationships in a representative profile graph DB may be changed dynamically, without the need for schema, application, and/or access interface changes.

These techniques also allow the representative profile graph DB to leverage third-party entities, when certain tenants/entity may have requirements to obscure business processes from other tenants/entities, etc. Such implementations also may reduce the need for multiple different software tools, each having corresponding different views. Rather, the graph DB representative profile store may connect all of the different data sets for a representative using the node-edge structure, allowing the data to be accessed and presented or analyzed more quickly, such as in-flight during queuing, routing, contact handling processes, etc. Graph DB representative profile stores also may support more robust and flexible algorithms, such as run-time algorithms using a natural language (NL) bot front-end experience to quickly access and retrieve representative profile data. For instance, a representative profile matching algorithm may retrieve a ranked or order list of available representatives, based on the skills of individual representatives, to identify an optimal responder with the right skills in real-time. In contrast, for conventional systems (e.g., using DB2) designing such functionality may require advance knowledge of the query patterns, interfaces, and data schema, so that the querying programming may be performed in advance, far up the development chain. Such systems may be much less flexible to change after design and deployment, and may be unable to be modified quickly to track the evolution of the data relationships integrated into the representative profile store. Graph DB representative profile stores can, in contrast, be re-mapped on the fly, where new attributes, new nodes, new queries, and new interfaces and be added quickly without impacting other existing functionality.

Figure 4:
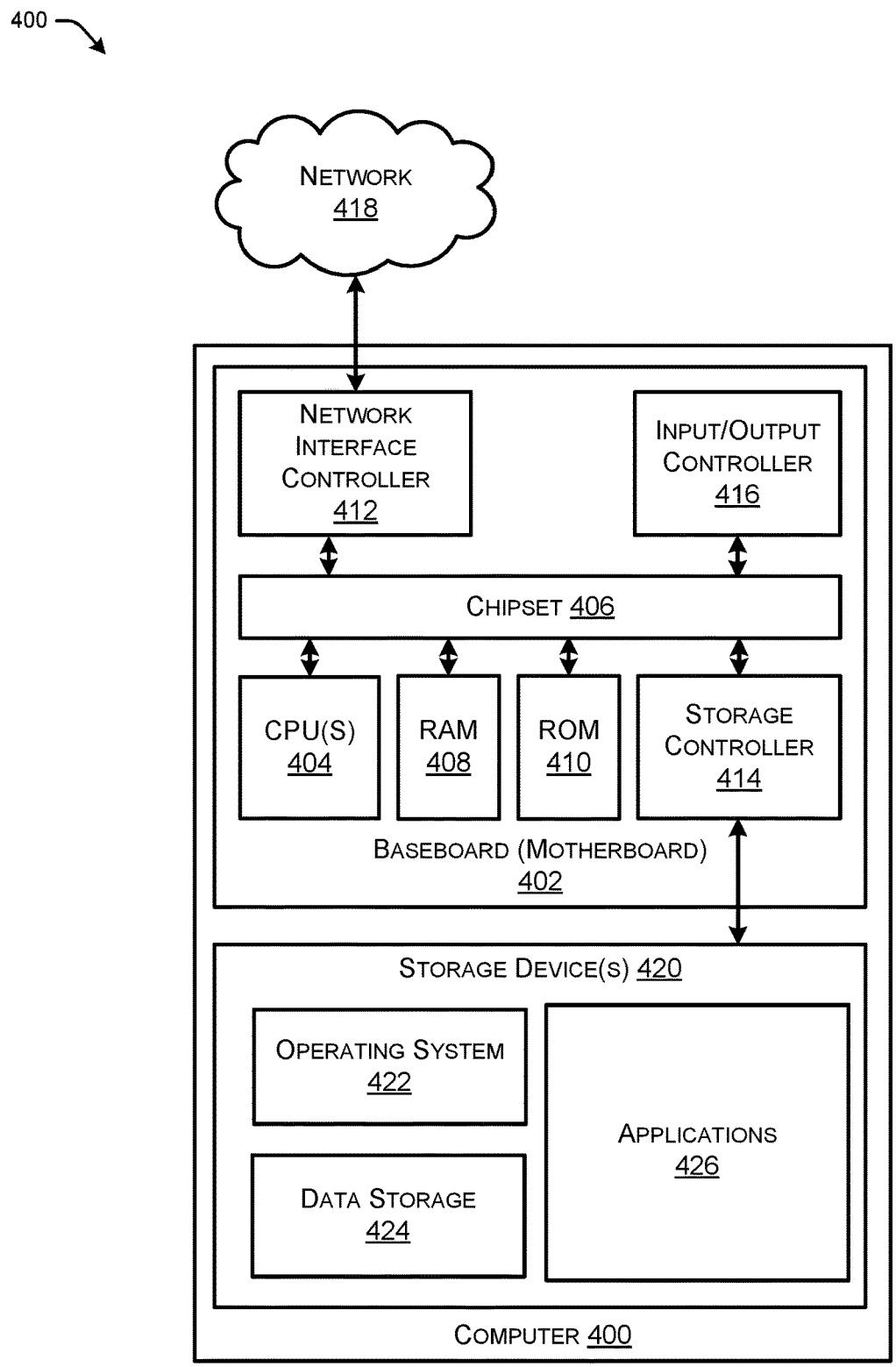
FIG. 4 is an example architecture for a computing device capable of executing program components for implementing various techniques described herein.

FIG. 4 shows an example computer architecture for a computer 400 capable of executing program components for implementing the functionality described herein. The computer architecture shown in FIG. 4 may correspond to the systems and components of a server computer, workstation, desktop computer, laptop, tablet, network appliance, mobile device (e.g., tablet computer, smartphone, etc.), or other computing device, and can execute any of the software components described herein. The computer 400 may, in some examples, correspond to any of the computing systems or devices described above, such as a representative data system 104, representative device 118, external communication service provider 106, internal operational system 124, and/or any other computing devices or servers executing the software components described herein. It will be appreciated that in various examples described herein, a computer 400 might not include all of the components shown in FIG. 4, can include additional components that are not explicitly shown in FIG. 4, and/or may utilize a different architecture from that shown in FIG. 4.

The computer 400 includes a baseboard 402, or "motherboard," which may be a printed circuit board to which a multitude of components or devices are connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a ROM 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network, such as the network 418, which may be similar or identical to network 108 discussed above. The chipset 406 also may include functionality for providing network connectivity through a Network Interface Controller (NIC) 412, such as a gigabit Ethernet adapter. The NIC 412 is capable of connecting the computer 400 to other computing devices over the network 418. It should be appreciated that multiple NICs 412 can be present in the computer 400, connecting the computer to other types of networks and remote computer systems. In some instances, the NICs 412 may include at least on ingress port and/or at least one egress port.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device.

The computer 400 can include one or more storage device(s) 420, which may be connected to and/or integrated within the computer 400, that provide non-volatile storage for the computer 400. The storage device(s) 420 can store an operating system 422, data storage systems 424, and/or applications 426, which are described in more detail herein. The storage device(s) 420 can be connected to the computer 400 through a storage controller 414 connected to the chipset 406. The storage device(s) 420 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device(s) 420 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device(s) 420 are characterized as primary or secondary storage, and the like.

For example, the computer 400 can store information to the storage device(s) 420 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device(s) 420 by detecting the physical states or characteristics of one or more particular locations within the physical storage units.

In addition to the storage device(s) 420 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400. In some examples, the various operations performed by a computing system (e.g., representative data system 104, representative device 118, internal operational system 124, etc.) may be supported by one or more devices similar to computer 400. Stated otherwise, some or all of the operations described herein may be performed by one or more computers 400 operating in a networked (e.g., client-server or cloud-based) arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device(s) 420 can store an operating system 422 utilized to control the operation of the computer 400. In some examples, the operating system 422 comprises a LINUX operating system. In other examples, the operating system 422 comprises a WINDOWS® SERVER operating system from MICROSOFT Corporation of Redmond, Washington. In further examples, the operating system 422 can comprise a UNIX operating system or one of its variants. It should be appreciated that other operating systems can also be utilized. The storage device(s) 420 can store other system or application programs and data utilized by the computer 400.

In various examples, the storage device(s) 420 or other computer-readable storage media is encoded with computer-executable instructions which, when loaded into the computer 400, transform the computer from a general-purpose computing system into a special-purpose computer capable of implementing various techniques described herein. These computer-executable instructions transform the computer 400 by specifying how the CPUs 404 transition between states, as described above. In some examples, the computer 400 may have access to computer-readable storage media storing computer-executable instructions which, when executed by the computer 400, perform the various techniques described herein. The computer 400 can also include computer-readable storage media having instructions stored thereupon for performing any of the other computer-implemented operations described herein.

As illustrated in FIG. 4, the storage device(s) 420 may store one or more data storage systems 424 configured to store data structures and other data objects. Additionally, the software applications 426 stored on the computer 400 may include one or more client applications, services, and/or other software components. For example, application(s) 426 may include any combination of the components 202-212 within a representative data system 104, and/or other software components described above in reference to FIGS. 1-3.

Figure 5:
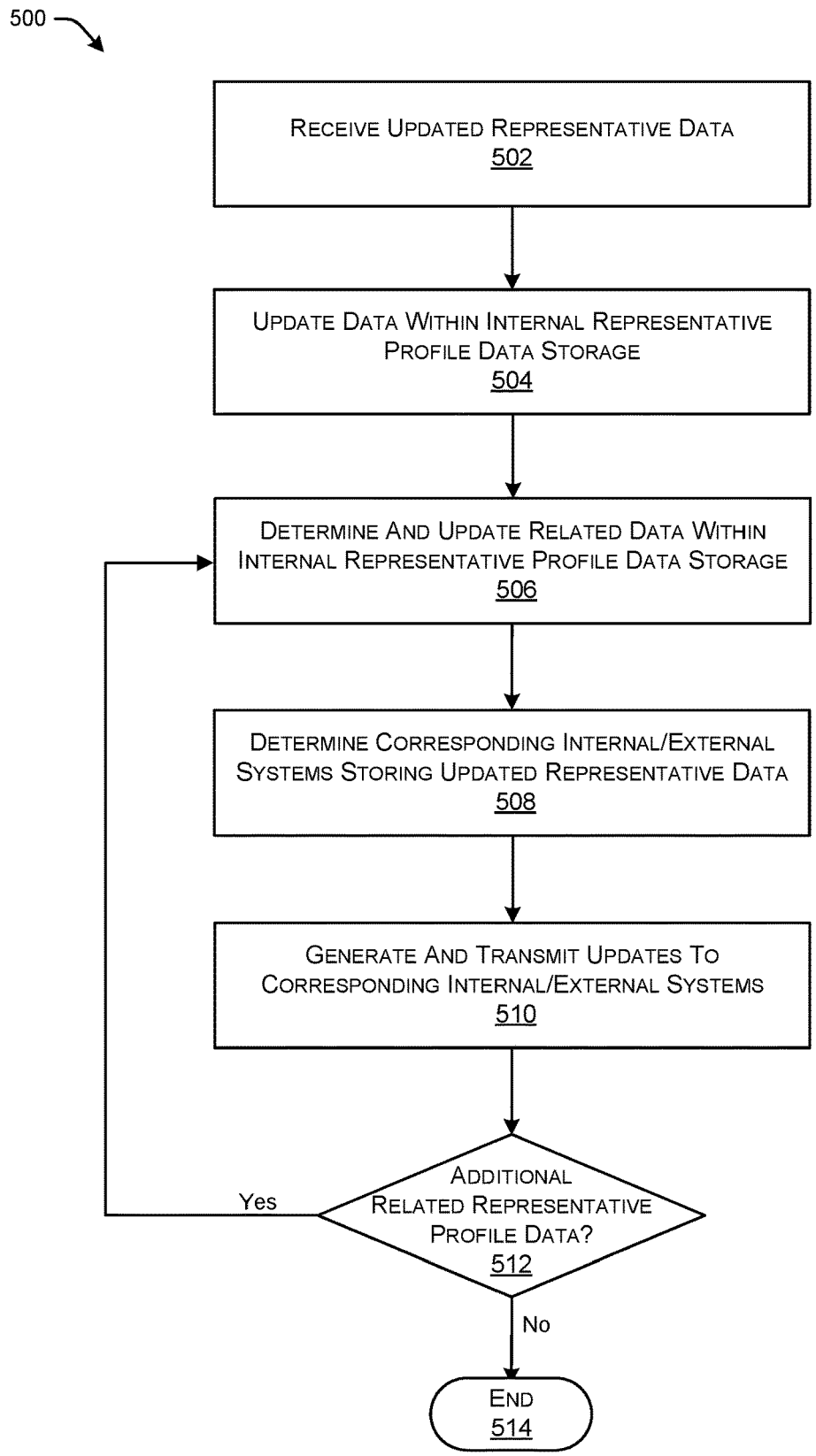
FIG. 5 is a flow diagram illustrating an example process of updating representative profile data in a contact center environment, in accordance with one or more examples of the present disclosure.

FIG. 5 is a flow diagram illustrating a process 500 of updating representative profile data in a contact center 100. The techniques and operations of process 500 may be performed by a representative data system 104 operating within a contact center 100, alone or in combination with any of the additional components described above in FIGS. 1-3. As discussed below, process 500 includes operations that may be performed in response to receiving a request from a representative device 118 or other client devices/system to update one or more representative profiles in the contact center 100.

At operation 502, the representative data system 104 receives updated profile data for one or more representatives of the contact center 100. As described above, the updated representative profile data may be received in a request from a client device via the interface component 202, or from an internal operational system 124 or internal data source 130 via the profile creation/modification component 204. The updated profile data received in operation 502 may include any of the representative-related data described herein, such as employee data, contact center performance metrics, external service provider communication settings, etc. Additionally, the updated profile data received in operation 502 need not directly describe a representative in the contact center 100, but also may relate indirectly to one or representatives. Indirectly related representative data includes data such as updates to the hours of operation of a contact center location associated with the representative, a change in the number/type of queues used by the contact center 100 to queue incoming contacts, or a change to the requirements of a representative to handle certain types of contacts, etc.

At operation 504, the representative data system 104 updates the representative profile data stored within the internal data storage of the representative data system 104. For example, the interface component 202 and/or profile creation/modification component 204 may initiate an update to the DBMS 212 to change the representative profile data based on the data received in operation 502. The data updated at operation 504 within the DBMS 212 may include any combination of the representative profile data described herein. By way of example, the updating of the DBMS 212 may include table/node updates to add a new representative, modify an existing representative, modify the attributes associated with an external service provider 106 (e.g., updated hours, configuration settings, etc.).

At operation 506, the representative data system 104 determines and updates additional related data within the internal data storage of the representative data system 104, based on the data updates performed in operation 504. In some cases, data relationships such as those discussed above in reference to FIG. 3 may be used to identify related data within the DBMS 212 of the representative data system 104 to be updated based on the updates performed in operation 504. As an example, if a representative is moved from one team to another within the organization, the data updates to the DBMS 212 in operation 504 may including updating that representative's profile. In operation 506, the representative data system 104 uses the data dependencies defined by the DBMS 212 to determine associated data that should be updated to reflect the representative changing teams, such as the representative's old and new supervisor and/or workforce capacities or performance statistics associated with the representative's old and new teams.

At operation 508, the representative data system 104 determines the internal and/or external systems that store representative profile data associated with the data updated internally in operations 504 and 506. As discussed above in reference to FIG. 2, certain representative profile data may be stored internally within the DBMS 212 and also stored separately within one or more systems outside of the representative data system 104. For instance, representative profile data such as configuration settings and security profiles may be stored in the external communication service providers 106 for any representatives associated with those service providers. Additionally, external data sources 112 and/or internal data sources 130 may store various representative-related data (e.g., employee data, skills/credentials data, contact center metrics, personality traits, etc.) that may be duplicated within the DBMS 212.

At operation 510, the representative data system 104 generates and transmits data updates to the external and internal systems of the contact center 100, corresponding to the data updates performed in operations 504 and 506. As described above, the representative data system 104 may use the service integration component 208 to lookup the appropriate GUIDs or other unique identifiers specific to external service provider 106 or other external system/data source to be updated. The representative data system 104 then may transmit the updated representative profile data via the service integration component 208 to the external service provider 106, external data sources 112, external contact center tools 114 (or internal systems/data sources) so that the representative profile data in these additional systems remains synchronized with the corresponding representative profile data in the DBMS 212. In some examples, the representative data system 104 receives a response or confirmation from the external service provider 106 or other external system to indicate that the corresponding representative profile has (or has not) been updated successfully on the external system.

At operation 512, the representative data system 104 determines based on the data updates performed in operations 504, 506, and/or 510 whether additional representative profile data is related that should be updated as well. In some examples, the representative data system 104 performs the determination in operation 512 using the data synchronization component 210 along with the data dependencies and relationships stored in the DBMS 212. If there is no additional related representative profile data to be updated (512: No) based on the data updates made in operations 504, 506, and 510, then process 500 may terminate at operation 514. However, if one or more additional items of representative profile data are identified as being related to the data updated in operations 504, 506, and 510 (512:Yes), then the process returns to operation 506 to update the related additional representative profile data within the DBMS 212 and/or within the various other internal/external systems of the contact center 100.

To illustrate the recursive or successive nature of updates representative profile data using the representative data system 104, an example may be described in which a representative is added to a team within the organization that is authorized to handle a particular type of messaging/web chat customer contacts. In this example, the security profile data for the representative is updated within the DBMS 212, and corresponding security profile updates are transmitted to the external messaging/chat service provider 106B. In this example, due to team/organization constraints or rules enforced by an internal operational system 124, the representative may be limited to a single type/media of contact. Accordingly, in this example the addition of the representative to the external messaging/chat service provider 106B may necessitate the removal of the representative from one or more other required external service providers 106. Additionally, the average performance metrics and aggregated skills profile for the team to which the representative has been added may be updated to account for the performance metrics and skills of the new representative. Further, updates to representative profile data within the DBMS 212 and/or with other internal or external systems may be triggered by the addition of the new representative to the team, by prompting an internal operational system 124 to recompute team workforce capacities at different times based on the location and regularly working hours of the new representative. In this example, the updated team workforce capacity of the team with the new representative may further trigger additional internal operational systems 124, such as systems to reallocate the representative workforce and/or re-assign different representatives to handle different types of contacts. Thus, this example illustrates that an initial modification of representative profile data and/or any other representative-related data at operations 504, 506, and 510 may result in a number of cascading changes to related representative profile data within the internal and external systems and data stores of the contact center 100, in order to maintain synchronization and data integrity of the representative profile data.

Figure 6:
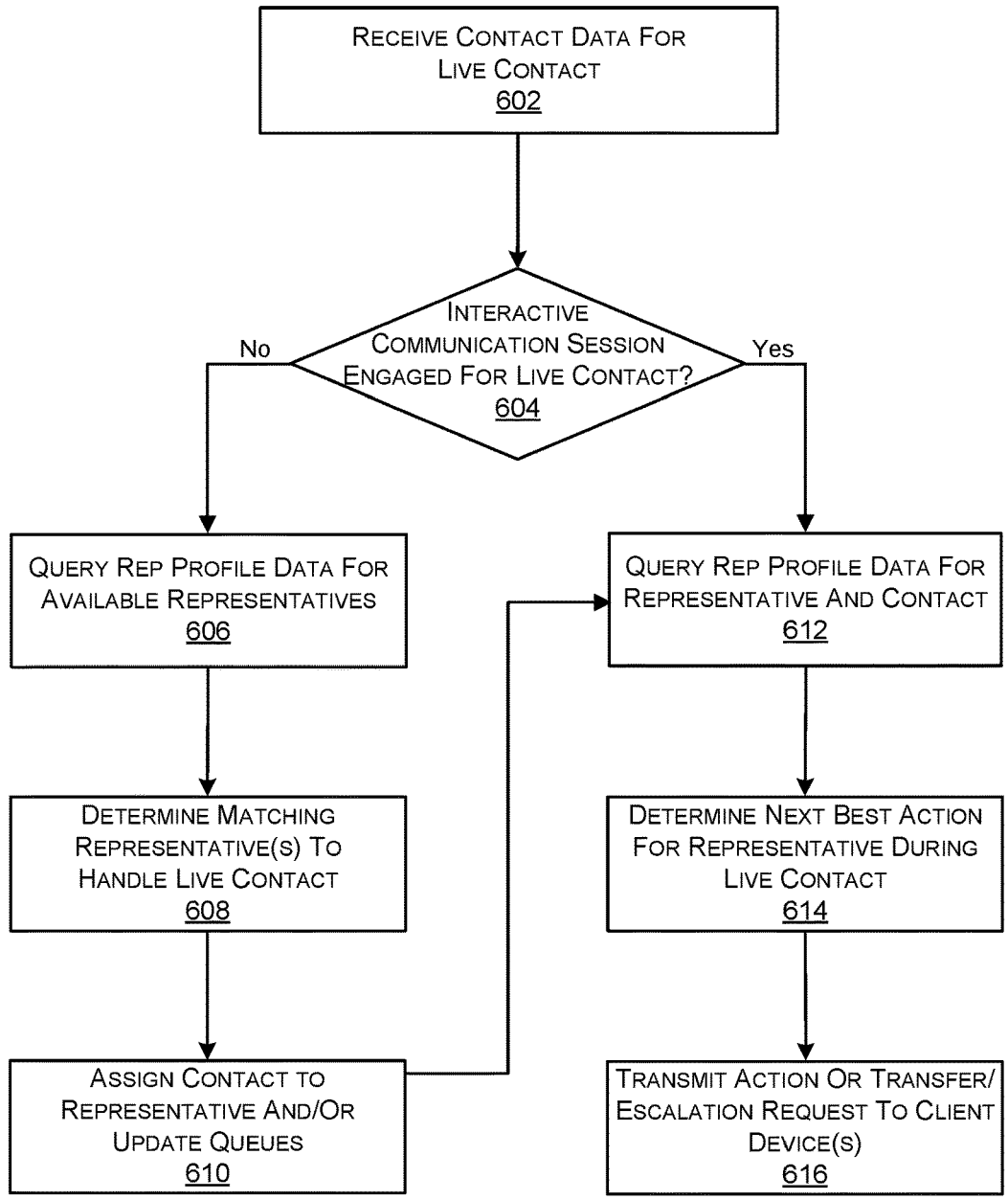
FIG. 6 is a flow diagram illustrating an example process of using representative profile data during contact assignment and/or management operations, in accordance with one or more examples of the present disclosure.

FIG. 6 is a flow diagram illustrating a process 600 of retrieving and using representative profile data during a runtime contact management process. The techniques and operations of process 600 may be performed by a representative data system 104 and/or an internal operational system 124 within a contact center 100, alone or in combination with any of the additional components described above in FIGS. 1-3. As discussed below, process 600 may be initiated by a contact management process executing within an internal operational system 124. During the contact management process, the representative data system 104 is invoked to retrieve and use various representative profile data to assign a representative to the live contact, and/or to determine a next best action for the representative to perform during the live contact.

At operation 602, the representative data system 104 receives contact data associated with a live contact in the contact center 100. A live contact in this example may refer to a contact having an active connection and/or a current interactive media session with a customer device 116 that has not yet been terminated. Live contacts may include requests for interactive communication sessions from customer devices 116 that have been queued but not yet connected to a representative device 118, and/or interactive sessions that have been initiated between customer devices 116 and representative devices 118 having active connections and media streams transmitted between the devices. In some examples, operation 602 may be initiated by an internal operational system 124 configured to manage the assignment of a contact to a representative in the contact center 100, as well as managing the representative's handling of the contact during the live interactive session.

At operation 604, the representative data system 104 may determine whether the live contact is engaged in an interactive communication session with a representative. As noted above, when a live contact is first received by the contact center 100, it initially may be queued while awaiting assignment to a representative. Additionally, at various times during the live contact, the customer may be placed on-hold and/or transferred to a different representative, supervisor, or other organization personnel. In these examples, the representative data system 104 may invoke an internal operational system 124 and/or access a table within an internal data source 130 to determine whether the live contact is awaiting assignment, in-queue, on-hold, etc. If so, the representative data system 104 may determine that the live contact is not currently engaged in an interactive communication session with a representative (604:No), and may proceed to operations 606-610 during which a representative may be selected to handle the contact. In other examples, when the representative data system 104 determines that the live contact is currently engaged in an interactive session with a representative (604:Yes), then the representative data system 104 may proceed to operations 612-616 to determine a next best action for the representative to perform during the interactive session with the customer.

At operation 606, the representative data system 104 may query the DBMS 212 to retrieve a subset of the representative profile data associated with the representatives that are currently available to handle contacts in the contact center 100. As noted above, the DBMS 212 receives and stores representative profile data from a number of disparate systems internal and external to the contact center 100, \including external communication service providers 106, external data sources 112, external contact center tools 114, internal operational systems 124, and internal data sources 130. Accordingly, the data retrieval at operation 606 may including retrieving multiple various types/sources of representative profile data from the single internal data store implemented by the DBMS 212. For instance, in operation 606 the representative data system 104 may retrieve, for each representative that is currently available, the representative's current status, work schedule, current location, current device type, the representative's hourly, daily, weekly, and monthly performance metrics and contact handling trends, the representative's configuration settings and security profiles at different external communication service providers 106, the representative's licenses/credentials, experience level, personality attributes, etc. Because these data are retrieved from a single internal data store, the DBMS 212, the data retrieval in operation 606 may be performed quickly during runtime without additional delays to query the disparate external data sources and join the resulting representative profile data from the separate sources.

At operation 608, the representative data system 104 may analyze the representative profile data retrieved in operation 606 for the currently available representatives, and may compare the representative profile data to the known attributes of the contact to select a representative to handle the contact. The determination of the representative in operation 608 may be performed within the representative data system 104 (e.g., within the profile retrieval/analysis component 206) or within an internal operational system 124 invoking the representative data system 104. The determination of a representative to handle the live contact in operation 608 may be on a comparison of various contact/customer data (e.g., customer personality information, customer account information, customer location, customer device type, issue description, etc.) to the corresponding representative data retrieved in operation 606. Various ranking algorithms may be selected and executed to determine a most suitable representative to handle the contact based on the representative profile data stored in the DBMS 212.

At operation 610, the representative data system 104 and/or the internal operational system 124 may assign the live contact to the representative determined in operation 608. In some examples, the assignment in operation 610 may include the internal operational system 124 initiating the interactive media session between the customer device 116 and the representative device 118 of the selected representative.

As noted above, operations 612-616 relate to retrieving and using representative profile data stored in the DBMS 212 to determine a next best action for the representative to perform during the interactive session with the customer. At operation 612, the representative data system 104 may query the representative profile data within the DBMS 212 related to the assigned representative and/or the customer. The retrieval of representative profile data in operation 612 may be similar or identical to the query/retrieval of representative profile data described above in operation 606. In some examples, the representative profile data retrieved may relate to the specific representative assigned to the contact, and the representative data for other representatives need not be retrieved.

At operation 614, the representative data system 104 and/or the internal operational system 124 may determine a next best action for the assigned representative to perform during the live contact with the customer. In some examples, the internal operational system 124 may execute a set of rules and/or models at operation 614 relating to determining a next best action for the representative to perform during the interactive session with the customer. The determination in operation 614 may be based on the profile data for the assigned representative retrieved from the DBMS 212 in operation 612. For instance, the internal operational system 124 may execute various rules and/or models to determine whether or not the live contact should be rerouted or escalated to a supervisor, based in part on the representative profile data retrieved in operation 612. Next best action determinations made at operation 614 also may include recommendations to transfer the contact to a different representative, escalate the contact to a manager or supervisor, or offer the customer a discount or other incentive not to cancel or change their service.

At operation 616, the representative data system 104 and/or the internal operational system 124 may use one or more techniques to implement the next best action determined in operation 616 during the course of the live contact. For example, if the next best action determined in operation 614 is a contact-management recommendation for the representative (e.g., a technical support suggestion, product cross-selling or upselling opportunity, conflict de-escalation strategy, etc.), then in operation 616 the internal operational system 124 may transmit the recommendation to the representative device 118 to be surfaced via the representative client application/user interface. In other examples, if the next best action determined in operation 614 corresponds to a recommendation to transfer the customer, escalate an issue, alert a supervisor or manager, etc., then the in operation 616 the internal operational system 124 may initiate the next best action by invoking a process within the contact center 100 and/or by transmitting a request to a potential transferee representative device 118, supervisor device 126, and/or administrator device 128.

Figure 7:
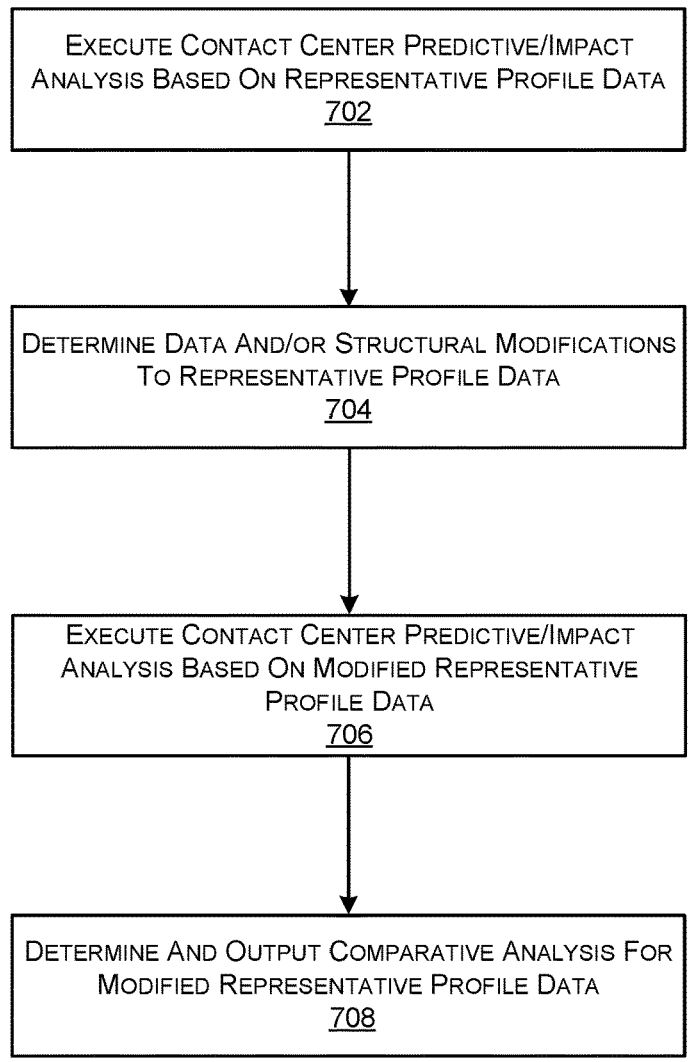
FIG. 7 is a flow diagram illustrating an example process of using a representative data system to execute predictive models and/or impact analysis for the contact center environment, in accordance with one or more examples of the present disclosure.

FIG. 7 is a flow diagram illustrating a process 700 of using representative profile data to execute predictive models and/or impact analysis for a contact center 100. Similar to process 600 discussed above, the techniques and operations of process 700 may be performed by a representative data system 104 and/or an internal operational system 124 within a contact center 100, alone or in combination with any of the additional components described above in FIGS. 1-3. Process 700 also may be initiated by an internal operational system 124 configured to executing advanced analytical processes such as impact analyses and/or predictive modeling functions.

At operation 702, an internal operational system 124 may execute one or more predictive modeling and/or impact analysis process for the contact center 100. The predictive modeling/impact analysis processes executed in operation 702 may include, for instance, a performance metric prediction for the contact center 100 based on an anticipated upcoming call volume, an outage simulation for the contact center 100 in which a location housing multiple representative devices 118 loses power for some amount of time, or a workflow management simulation in which the customers encountering a particular software error are routed into a different contact center queue. In some examples, the execution of such predictive modeling/impact analysis processes may include the retrieval and analysis of representative profile data from the representative data system 104. As noted above, when the representative profile data is stored in the internal DBMS 212, the data may be retrieved and used in the modeling and/or analysis in operation 702, during runtime and in a performant manner without the delays of querying the disparate external systems and joining the results. For instance, a predictive modeling process or impact analysis for the contact center 100 performed in operation 702 may include retrieving and using certain representative attributes and/or other profile data for the set of representatives currently connected to the contact center environment (or scheduled for the times predictive modeling process or impact analysis). Additionally, it should be understood that these examples are illustrative only and that the techniques described herein may applied to any data analysis process within the contact center 100.

At operation 704, the representative data system 104 may determine and implement one or more modifications to the data and/or structure of the representative profile data. As an example, the representative profile data within the DBMS 212 may be modified by adding or removing a number of representatives at various locations and various teams of the organization. As another example, the representative profile data within the DBMS 212 may be modified by changing the set of external communication service providers 106 used by the contact center 100. As yet another example, the representative profile data within the DBMS 212 may be modified by changing the hours of operation of a contact center location or service provider of the contact center 100. In some cases, operation 704 may include copying selected portions of the DBMS 212, or the entire DBMS 212, within the representative data system 104 to implement the data and/or structural changes, so that the original version of the DBMS 212 remains unmodified.

At operation 706, the internal operational system 124 may execute the same predictive modeling and/or impact analysis processes performed for the contact center 100 in operation 702, using the modified data and/or structure of the representative profile data determined in operation 704. For instance, if the modeling/analysis process performed in operation 702 included a partial outage simulation for the contact center 100, then the same partial outage simulation may be performed in operation 706, but using the modified representative profile data determined in operation 704. As noted above, the modified representative profile data may include various changes to the representative profile data, such as different numbers of representatives and/or different representative assignments or attributes, different external communication service providers, etc.

At operation 708, the internal operational system 124 may perform a comparative analysis between the original representative profile data and the modified representative profile data, by comparing the results of the modeling/analysis process performed in operation 702 with the results of the modeling/analysis process performed in operation 706. Thus, the comparative analysis in operation 708 may be used to improve the operation of the contact center 100 under the simulated contacts, by modifying the representative profiles within the contact center 100. For instance, potential modifications may include adding or reallocating a number of representatives within the contact center 100, or managing the representative workforce to increase/decrease the number of representatives having specific attributes (e.g., working hours or locations, skills or credentials, personality traits, etc.), based on the performance differences attributable to the different representative profiles during the modeling/analysis processes.

As illustrated by the examples above, the techniques described herein provide technical advantages which improve the capabilities and functioning of contact center environments including multiple internal and external systems and data sources. In contrast to conventional contact centers, a representative data system as described herein includes functionality for storing and accessing multiple types and sources of representative profile data within a single integrated data store. For instance, representative profile data from internal contact center systems, service providers, the contact center infrastructure, external systems and services, etc., may be stored together within a relational or graph-based database management system. Unlike conventional contact centers that require client systems to contact multiple disparate systems to retrieve and/or modify representative data, the representative data system provides a single point of contact and a unified interface for accessing and modifying representative profile data. The representative data system also improves the operation of the contact center by supporting plug-and-play functionality, using a service integration component to provide uniform and seamless interaction with various different external communication service providers, and other internal/external systems or data sources. This plug-and-play functionality allows various external systems (e.g., service providers, tools, data sources, etc.) to be added, removed, replaced, or upgraded without requiring time-consuming manual updates to the separate systems and data sources associated with the contact center.

The representative data system described herein also improves contact queuing, routing, and management, along with workload management and other runtime processes executing within the contact center. Unlike conventional contact centers, the representative data system maintains multiple different sources and dimensions of representative profile data within a single integrated data system, and thus is not required to retrieve and correlate representative profile data from disparate systems. The data design and implementation of the representative data system allow representative profile data to be retrieved and analyzed quickly in runtime by the operational systems and processes of the contact center. The capabilities for contact center processes to analyze and correlate various sources of representative profile data in a highly performant manner during runtime improves the functionality and efficiency of contact queuing, routing, management, workforce management, escalation and intervention determinations, and other runtime contact center operations.

Further, in some examples the representative data system described herein improves the capabilities and performance of contact center environments when performing advanced predictive modeling and impact analysis. For instance, representative data systems implemented using graph-based data structures provide a data driven paradigm that allows the representative data system to analyze and recommend potential structural and data changes within the contact center environment. In such examples, the flexible design of graph databases allows the contact center to model and analyze complex scenarios such as service outages, dynamic workload shifting, infrastructure changes, and workforce changes.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on."

As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A contact center server, comprising:
   one or more processors; and
   one or more non-transitory computer-readable media storing computer-executable instructions that, when executed by the one or more processors, cause the one or more processors to perform operations comprising:
   receiving first data associated with a contact center representative from an interactive communication service executing outside of the contact center server;
   receiving second data associated with the contact center representative from a data source associated with the contact center server;
   storing the first data as a first node and the second data as a second node in a graph-based data store within the contact center server;
   storing an edge within the graph-based data store between the first and second nodes, based on a relationship between the first data and the second data;
   receiving, from an internal operational system associated with the contact center server, a request to execute a function;
   retrieving data including at least one of the first data or the second data from the graph-based data store; and
   executing the function using the retrieved data from the graph-based data store.

2. The contact center server of claim 1, wherein executing the function comprises at least one of:
   assigning the contact center representative to a requested interactive communication session; or
   determining a contact management recommendation for the contact center representative during an interactive communication session.

3. The contact center server of claim 1, wherein executing the function comprises:
   determining a first modification to the graph-based data store, based on the request received from the internal operational system;
   performing a first execution of at least one of a workforce management process, an impact analysis process, or a predictive modeling process based on the graph-based data store excluding the first modification; and
   performing a second execution of at least one of the workforce management process, the impact analysis process, or the predictive modeling process based on the graph-based data store including the first modification.

4. The contact center server of claim 1, the operations further comprising:
receiving updated data associated with the contact center representative;
modifying the graph-based data store associated with the contact center representative based on the updated data; and
transmitting the updated data to at least one of the interactive communication service or the data source associated with the contact center server.

5. The contact center server of claim 4, wherein the operations further comprise:
determining a third node within the graph-based data store associated with the updated data;
determining a target system associated with a fourth node, by traversing the graph-based data store starting at the third node to the fourth node; and
transmitting the updated data to the target system.

6. The contact center server of claim 1, wherein the interactive communication service comprises at least one of:
an external voice communication service;
an external video communication service; or
an external chat communication session.

7. The contact center server of claim 6, wherein the data source comprises an internal data source associated with the contact center server, and wherein the second data comprises at least one of:
a location associated with the contact center representative;
a title associated with the contact center representative;
a team within an organization associated with the contact center representative;
a credential associated with the contact center representative;
a skill associated with the contact center representative;
a language associated with the contact center representative; or
a personality trait associated with the contact center representative.

8. The contact center server of claim 1, wherein the graph-based data store is configured to store temporal data associated with the contact center representative, and wherein the operations further comprise:
querying, at a first time, the graph-based data store for a second time previous to the first time, to determine a previous state of the graph-based data store associated with the contact center representative at the second time.

9. The contact center server of claim 1, wherein retrieving the data comprises:
traversing an edge of the graph-based data store, from at least one of the first node or the second node, to determine a third node within the graph-based data store; and
retrieving the data from the third node.

10. The contact center server of claim 1, wherein:
the first node in the graph-based data store is associated with a hierarchical relationship of the contact center representative within an organization;
the second node in the graph-based data store is associated with a skill or proficiency of the contact center representative; and
a third node in the graph-based data store is associated with a queue assignment of the contact center representative.

11. A method, comprising:
receiving, by a contact center server, first data associated with a contact center representative from an interactive communication service executing outside of the contact center server;
receiving second data associated with the contact center representative from a data source associated with the contact center server;
storing the first data as a first node and the second data as a second node in a graph-based data structure associated with the contact center representative user within the contact center server;
storing an edge within the graph-based data structure between the first and second nodes, based on a relationship between the first data and the second data;
receiving, from an internal operational system associated with the contact center server, a request to execute a function;
retrieving data including at least one of the first data or the second data from the graph-based data structure; and
executing the function using the retrieved data from the graph-based data structure.

12. The method of claim 11, wherein executing the function comprises at least one of:
assigning the contact center representative to a requested interactive communication session; or
determining a contact management recommendation for the contact center representative during an interactive communication session.

13. The method of claim 11, wherein executing the function comprises:
determining a first modification to the graph-based data structure, based on the request received from the internal operational system;
performing a first execution of at least one of a workforce management process, an impact analysis process, or a predictive modeling process based on the graph-based data structure excluding the first modification; and
performing a second execution of at least one of the workforce management process, the impact analysis process, or the predictive modeling process based on the graph-based data structure including the first modification.

14. The method of claim 11, further comprising:
receiving updated data associated with the contact center representative;
modifying the graph-based data structure associated with the contact center representative based on the updated data; and
transmitting the updated data to at least one of the interactive communication service or the data source associated with the contact center server.

15. The method of claim 14, wherein the method further comprises:
determining a third node within the graph-based data structure associated with the updated data;
determining a target system associated with a fourth node, by traversing the graph-based data structure starting at the third node to the fourth node; and
transmitting the updated data to the target system.

16. The method of claim 11, wherein the graph-based data structure is configured to store temporal data associated with the contact center representative, and wherein the method further comprises:

querying, at a first time, the graph-based data structure for a second time previous to the first time, to determine a previous state of the graph-based data structure associated with the contact center representative at the second time.

17. The method of claim 11, wherein retrieving the data comprises:
traversing an edge of the graph-based data structure, from at least one of the first node or the second node, to determine a third node within the graph-based data structure; and
retrieving the data from the third node.

18. The method of claim 11, wherein:
the first node in the graph-based data structure is associated with a hierarchical relationship of the contact center representative within an organization;
the second node in the graph-based data structure is associated with a skill or proficiency of the contact center representative; and
a third node in the graph-based data structure is associated with a queue assignment of the contact center representative.

19. One or more non-transitory computer-readable media storing instructions executable by a processor, wherein the instructions, when executed by the processor, cause the processor to perform operations comprising:
receiving, by a contact center server, first data associated with a contact center representative from an interactive communication service executing outside of the contact center server;
receiving second data associated with the contact center representative from a data source associated with the contact center server;
storing the first data as a first node and the second data as a second node in a graph-based data structure associated with the contact center representative within the contact center server;
storing an edge within the graph-based data structure between the first and second nodes, based on a relationship between the first data and the second data;
receiving a request to execute a function associated with the contact center representative;
retrieving data including at least one of the first data or the second data from the graph-based data structure associated with the contact center representative; and
executing the function using the retrieved data from the graph-based data structure.

20. The one or more non-transitory computer-readable media of claim 19, the operations further comprising:
receiving updated data associated with the contact center representative;
modifying the graph-based data structure associated with the contact center representative based on the updated data; and
transmitting the updated data to at least one of the interactive communication service or the data source associated with the contact center server.

* * * * *